United States Patent Office 3,182,076
Patented May 4, 1965

3,182,076
CARBOXYALKYL ORGANOSILOXANES
Norman G. Holdstock, Scotia, N.Y., assignor to General Electric Company, a corporation of New York
No Drawing. Filed May 31, 1962, Ser. No. 198,725
4 Claims. (Cl. 260—448.2)

This invention relates to a certain class of organopolysiloxanes containing silicon-bonded carboxyalkyl radicals. More particularly, the present invention relates to a specific class of carboxyalkyl organopolysiloxanes having the formula:

(1)
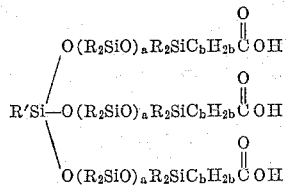

where R and R' are monovalent hydrocarbon radicals, $a$ has a value of at least 2, e.g., from about 2 to 40 or more and $b$ has a value of from 2 to 3, inclusive.

The compositions within the scope of Formula 1, which will be often referred to hereinafter for brevity as "carboxyalkylpolysiloxanes," are useful in many applications where water and alcohol soluble organopolysiloxanes are desirable. For example, these compositions are useful as emulsifying agents for the formation of aqueous emulsions of conventional organopolysiloxane fluids and in applications such as alcohol base cosmetics. These materials are also useful for the formation of more complex products, for example, by the formation of various esters such as the esters described in my copending application Serial No. 198,710 filed concurrently herewith and assigned to the same assignee as the present invention. The esters of the aforementioned copending application are prepared by the esterification of the carboxyalkylpolysiloxanes of Formula 1 with monoalkyl ethers of polyalkylene glycols to form products which are particularly useful as aids in the formation of polyurethane foams.

The carboxyalkylpolysiloxanes of Formula 1 are characterized by the presence of three silicon-bonded carboxyalkyl radicals per molecule, each of which is connected to a trifunctional silicon atom through a polydiorganosiloxane chain. The carboxyalkyl radical is characterized by the fact that the carboxyl group is attached to silicon through at least 2 carbon atoms. Thus, the carboxyalkyl radical can be a beta-carboxyethyl radical, a beta-carboxypropyl radical or a gamma-carboxypropyl radical.

Among the radicals represented by R and R' in the carboxyalkylpolysiloxane of Formula 1 can be mentioned, for example, alkyl radicals, e.g., methyl, ethyl, propyl, butyl, octyl, etc. radicals; cycloalkyl radicals, e.g., cyclohexyl, cycloheptyl, etc. radicals; aryl radicals, e.g., phenyl, tolyl, naphthyl, xylyl, etc. radicals; aralkyl radicals, e.g., benzyl, phenylethyl, etc. radicals; alkenyl and cycloalkenyl radicals, e.g., vinyl, allyl, cyclohexenyl, etc. radicals; and halogenated radicals of the aforementioned type, e.g., chloromethyl, chlorophenyl, dibromophenyl, etc. radicals. In the preferred embodiment of my invention, both the R and R' radicals are alkyl or aryl radicals, with the methyl and phenyl radicals being the specific preference.

The carboxyalkylpolysiloxanes of Formula 1 can be readily formed by the hydrolysis and condensation of a mixture of an organotrichlorosilane having the formula:

(2)  R'SiCl₃ a diorganodichlorosilane having the formula:

(3)  R₂SiCl₂ and a cyanoalkyldichlorosilane having the formula:

(4)  R₂Si(Cl)C$_b$H$_{2b}$CN where R, R' and $b$ are as previously defined.

During the hydrolysis and condensation of the reactants of Formulae 2 through 4, the various silicon-bonded chlorine atoms are replaced by silicon-bonded hydroxyl groups which intercondense to form siloxane linkages and the nitrile radical hydrolyzes to a carboxyl radical.

The cyanoalkyldiorganochlorosilane of Formula 4 is prepared by effecting reaction between a diorganochlorosilane having the formula:

(5)  R₂SiHCl where R is as previously defined, and either acrylonitrile, methacrylonitrile or allyl cyanide in the presence of a suitable catalyst. Processes for producing compositions within the scope of Formula 4 are known in the art and are described, for example, in Patents 2,906,764, 2,906,765 and 2,913,472.

An alternative method for producing cyanoalkyldiorganochlorosilanes within the scope of Formula 4 is by preparing a cyanoalkylorganodichlorosilane, such as beta-cyanoethylmethyldichlorosilane by the addition of methyldichlorosilane to acrylonitrile in the presence of a suitable catalyst as shown in Patent 2,971,970 and Patent 2,971,971 and effecting a Grignard reaction as shown in the aforementioned Patent 2,913,472 to replace a silicon-bonded chlorine atom with a silicon-bonded organic group.

Illustrative of the diorganochlorosilanes within the scope of Formula 5 are dimethylchlorosilane, methylphenylchlorosilane, diphenylchlorosilane, ethylpropylchlorosilane, etc. Products within the scope of Formula 4 include, for example, dimethyl-beta-cyanoethylchlorosilane, methylphenyl-beta-cyanoethylchlorosilane, diphenyl - gamma - cyanopropylchlorosilane, methylcyclohexyl-beta-cyanopropylchlorosilane, etc. The cyanoalkyldiorganochlorosilanes of Formula 4 are characterized by the fact that the nitrile group is attached to a carbon atom which is at least one carbon atom removed from the silicon atom, i.e., the cyano group is beta or gamma with respect to the silicon atom.

Illustrative of the organotrichlorosilanes within the scope of Formula 2 and the diorganochlorosilanes within the scope of Formula 3 which are cohydrolyzed and condensed with the cyanoalkyldiorganochlorosilane of Formula 4 are methyltrichlorosilane, phenyltrichlorosilane, amyltrichlorosilane, cyclohexyltrichlorosilane, vinyltrichlorosilane, benzyltrichlorosilane, dimethyldichlorosilane, methylphenyldichlorosilane, diphenyldichlorosilane, methylethyldichlorosilane, methylcyclohexyldichlorosilane, methylvinyldichlorosilane, etc.

To form the carboxyalkylpolysiloxane of Formula 1, the organotrichlorosilane of Formula 2, the diorganodichlorosilane of Formula 3 and the diorganocyanoalkylchlorosilane of Formula 4 are mixed together in the proportions in which the siloxane units derived therefrom appear in the carboxyalkylpolysiloxane. This mixture is then slowly added to water with stirring so as to facilitate the hydrolysis and condensation of the silicon-bonded chlorine atoms and the hydrolysis of the nitrile groups to carboxyl groups.

In general, the amount of water employed in the hydrolysis and condensation reaction is sufficient to hydrolyze all of the silicon-bonded chlorine atoms and also sufficient to provide a solvent for the hydrogen chloride which results from the hydrolysis. Preferably, the amount of water is maintained at a value sufficiently low to provide a concentrated hydrogen chloride solution or even so low as to be insufficient to dissolve all of the hydrogen chloride. Where the amount of water is insufficient to dissolve the hydrogen chloride generated, it is desirable to maintain the reaction mixture under pressure, such as a pressure up to about 50 lbs./sq. in., so as to avoid the loss of hydrogen chloride. In general, the amount of water employed is from about 0.75 to 1.25 parts by weight per part of the mixture of the three organochlorosilanes of Formulae 2 through 4. The hydrolysis and condensation reaction is found to be exothermic and it is found that the temperature increases to a maximum in the range of about 70° C. during the course of the hydrolysis and condensation, which is effected in times of from about 1 to 6 hours.

After completion of the hydrolysis and condensation reaction, water and hydrogen chloride are stripped to yield a reaction mixture containing a precipitate of ammonium chloride from the hydrolysis of the nitrile group to the carboxy group. This precipitate is filtered and the reaction mixture is then dried. In order to insure a uniform composition, the dried and filtered hydrolyzate is equilibrated with sulfuric acid. The conditions under which this equilibration are effected can vary within extremely wide limits. In general, satisfactory results are obtained by adding from about 1 to 5 percent by weight of 86% sulfuric acid to the hydrolyzate and heating the reaction mixture at a temperature of from about 75 to 125° C. for a time of from about 1 to 3 hours. At the end of this time, the reaction mixture is cooled and washed with water until the wash water is neutral. This results in the carboxyalkylpolysiloxane of Formula 1.

While the preceding method of preparing carboxyalkylpolysiloxane of Formula 1 is preferred, it should also be pointed out that the carboxyalkylpolysiloxane can also be made by a rearrangement and condensation reaction involving polysiloxanes and alkoxysilanes. More particularly, for example, a composition within the scope of Formula 1 in which R is methyl, R' is phenyl and $b$ is equal to 2, can be prepared by forming a reaction mixture of phenyltriethoxysilane, octamethylcyclotetrasiloxane and 1,3-bis-(beta-carboxyethyl)tetramethyldisiloxane and heating this mixture in the presence of concentrated sulfuric acid. This proportions of the various reactants are selected so as to provide the various siloxane units in the ratios desired in the final product within the scope of Formula 1.

The following examples are illustrative of the practice of my invention and are not intended for purposes of limitation. All parts are by weight.

The dimethyl-gamma-cyanopropylchlorosilane employed in the examples was prepared by charging 80 parts of allyl cyanide and 2 parts of a 5 percent by weight platinum-on-charcoal catalyst to a reaction vessel and adding 88 parts of dimethylchlorosilane dropwise over a period of about 2 hours. During the addition of the dimethylchlorosilane, the reaction temperature increased to about 100° C. The reaction mixture was then distilled at 25 millimeters and the condensate was fractionally distilled to yield a number of fractions including 51 parts of dimethyl-gamma-cyanopropylchlorosilane which boiled at 129° C. at 31 millimeters, which had a refractive index $n_D^{20}$ 1.4466 and which had a specific gravity of 0.9889. Elemental analysis of this material showed the presence of 8.99% nitrogen, 22.0% chlorine and 17.6% silicon as compared with the theoretical values of 8.66% nitrogen, 21.93% chlorine and 17.37% silicon.

The dimethyl-beta-cyanoethylchlorosilane employed in the examples was prepared by the Grignard alkylation of methyl-beta-cyanoethyldichlorosilane. Specifically, the Grignard reagent was employed in equimolar amounts as a methyl magnesium iodine solution in diethylether and heated at the reflux temperature of the reaction mixture. The ether was stripped off and the reaction mixture was then fractionally distilled to yield the dimethyl-beta-cyanoethylchlorosilane which had a boiling point of 99° C. at 30 millimeters.

Example 1

To about 2200 parts of water was slowly added with stirring a mixture of 150 parts methyltrichlorosilane, 1550 parts dimethyldichlorosilane and 480 parts of dimethyl-gamma-cyanopropylchlorosilane. The reaction mixture was maintained at a temperature of about 70° C. for 2 hours and then stripped to remove water and hydrogen chloride. The reaction mixture was then allowed to cool to room temperature and filtered to remove precipitated ammonium chloride and then heated at a temperature of about 110° C. to dry the reaction mixture. At this time, 42 parts of 86% sulfuric acid was added to the reaction mixture and the reaction mixture was maintained for 2 hours at 100° C. At the end of this time, the reaction mixture was repeatedly washed with water until the wash water was neutral. This resulted in a gamma-carboxypropylpolysiloxane within the scope of Formula 1 and having the formula:

(6) 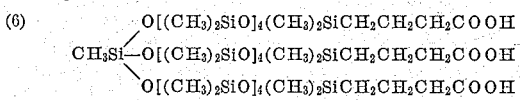

$$CH_3Si\begin{matrix}O[(CH_3)_2SiO]_4(CH_3)_2SiCH_2CH_2CH_2COOH\\ O[(CH_3)_2SiO]_4(CH_3)_2SiCH_2CH_2CH_2COOH\\ O[(CH_3)_2SiO]_4(CH_3)_2SiCH_2CH_2CH_2COOH\end{matrix}$$

This material was a clear, colorless liquid having a viscosity of 147 centipoises at 25° C., a refractive index $n_D^{25}$ 1.4204, a specific gravity of 1.01 and had an acid number of 119 as compared with the theoretical value of 122. The acid number is the number of milligrams of potassium hydroxide required to neutralize 1.0 gram of the polymer. The presence of the monomethylsiloxane unit in the product was confirmed by infrared analysis.

Example 2

Following the procedure of Example 1, another gamma-carboxypropylpolysiloxane within the scope of Formula 1 was prepared by slowly adding a mixture of 150 parts of methyltrichlorosilane, 2600 parts dimethyldichlorosilane and 480 parts dimethyl-gamma-cyanopropylchlorosilane to 3000 parts water. The resulting hydrolyzate was then stripped, filtered, dried and equilibrated with 100 parts of 87% sulfuric acid and washed with water until the wash water was neutral. The resulting product corresponded to the composition of Formula 1 where R and R' are methyl, $a$ has an average value of 6.7 and $b$ has a value of 3. This material was a clear, colorless liquid having a viscosity of 133 centipoises at 25° C., a refractive index $n_D^{25}$ 1.4144, a specific gravity of 1.00 and an acid number of 85.7 as compared with the theoretical value of 85.5.

Example 3

Another gamma-carboxypropylpolysiloxane within the scope of Formula 1 was prepared by slowly adding a mixture of 150 parts methyltrichlorosilane, 3900 parts dimethyldichlorosilane and 480 parts dimethyl-gamma-cyanopropylchlorosilane to 4500 parts of water with stirring during the addition. The reaction mixture was maintained at a temperature of about 75° C. for several hours, the reaction mixture was stripped to remove water and hydrogen chloride and then cooled and the ammonium chloride precipitate was filtered. The filtrate was then dried and equilibrated with 100 parts of 87% sulfuric acid and the equilibrate was washed with water until the wash water was neutral. This resulted in a gamma-carboxypropylpolysiloxane within the scope of Formula 1 where R and R' are methyl, $a$ is 30 and $b$ is 3. This carboxypropylpolysiloxane was also a clear, colorless liquid having a viscosity of 120 centipoises at 25° C., a refractive index $n_D^{25}$ 1.4107, a specific gravity of .992 and an acid number of 61.4 as compared with the theoretical value of 62.1.

Example 4

Following the procedure of Example 1, a beta-carboxyethylpolysiloxane within the scope of Formula 1 was prepared by slowly adding a mixture of 150 parts methyltrichlorosilane, 2600 parts dimethyldichlorosilane and 440 parts dimethyl-beta-cyanoethylchlorosilane to 3000 parts water. After maintaining the reaction mixture about 3 hours at 75° C., water and hydrogen chloride were removed by distillation, the precipitated ammonium chloride was filtered, the filtrate was dried and equilibrated with 75 parts of 87% sulfuric acid and then washed with water until the wash water was neutral. This resulted in a material within the scope of Formula 1 where R and R' are methyl, $a$ has a value of 6.7 and $b$ is equal to 2. This beta-carboxyethylpolysiloxane was a clear, colorless liquid having a viscosity of about 110 centipoises at 25° C. and an acid number of 88 as compared with the theoretical value of 88.3.

*Example 5*

This example illustrates the use of a carboxyalkylpolysiloxane of the present invention as an intermediate in the formation of a complex ester of the type described and claimed in my aforementioned copending application and the use of the resulting ester in the preparation of a polyurethane foam. A mixture was prepared of 140 parts of the gamma-carboxypropylpolysiloxane of Example 1, 1 part p-toluene sulfonic acid, 150 parts toluene and 450 parts of a monobutylether of a mixed polyethylene-polypropylene-1,2-glycol containing 50 weight percent polyoxyethylene groups and 50 weight percent polyoxypropylene groups and having a molecular weight of about 1500. This reaction mixture was heated for about 4 hours at the reflux temperature of the toluene solvent and then water was distilled from the reaction mixture. The resulting product was cooled, neutralized with sodium bicarbonate and filtered to remove solids. The reaction mixture was then heated to a temperature of about 150° C. at 10 millimeters to remove the toluene, resulting in a copolymer which was a clear, colorless fluid having a viscosity of about 900 centipoises at 25° C. and which corresponded to the formula:

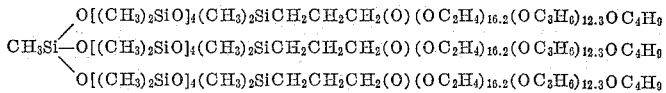

A flexible polyurethane one-step foam formulation was made from (A) 100 parts of a triol having a molecular weight of about 3000 and formed by reacting propylene oxide with glycerine to form three hydroxyl chain-stopped oxypropylene chains attached to the glycerine nucleus, (B) 0.3 part by weight of stannous octoate, (C) 38 parts by weight of a mixture of isomeric toluene diisocyanates comprising 80% by weight 2,-4-toluene diisocyanate and 20% by weight 2,6-toluene diisocyanate, (D) 0.05 part triethylene diamine, (E) 0.4 part N-ethylmorpholine, (F) 2.9 parts water and (G) 0.5 part of the silicone copolymer described above. The reactants were mixed together rapidly and allowed to foam in place. As a control, a formulation was prepared which was identical to the above except that no silicone copolymer was employed. After foaming was completed, the foams were examined. In both cases, the foams were a clear, white foam. In the case of the foam containing the silicone copolymer, the foam had small uniform cells and a density of 2.6 lbs./cu. ft. In the case of the control prepared without the silicone copolymer, no foam was obtained.

*Example 6*

Following the procedure of Example 1, a gamma-carboxypropylpolysiloxane within the scope of the present invention is prepared by slowly adding a mixture of 210 parts phenyltrichlorosilane, 2300 parts methylphenyldichlorosilane and 480 parts of dimethyl-gamma-cyanopropylchlorosilane to 300 parts water. The resulting reaction mixture is heated for several hours, stripped to remove water and hydrogen chloride and the precipitated ammonium chloride is filtered. The filtrate is dried and contacted with 100 parts of 87% sulfuric acid and heated at 100° C. for 2 hours to equilibrate the mixture. The equilibrate is washed with water until the wash water is neutral to produce a gamma-carboxypropylpolysiloxane having the formula:

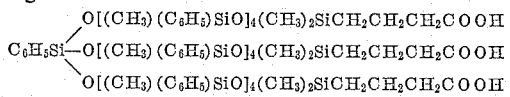

This material is a clear, colorless liquid.

What I claim as new and desire to secure by Letters Patent of the United States is:

1. A carboxyalkylpolysiloxane fluid having the formula:

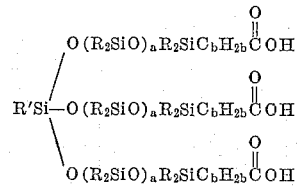

where R and R' are monovalent hydrocarbon radicals, $a$ has a value of about 2 to 40 and $b$ has a value of from 2 to 3, inclusive.

2. The composition of claim 1 in which R and R' are methyl.

3. The composition of claim 2 in which $b$ is equal to 2.

4. The composition of claim 2 in which $b$ is equal to 3.

References Cited by the Examiner

UNITED STATES PATENTS 2,486,162 12/48 Hyde _____ 260—46.5
3,047,528 7/62 Bluestein _____ 260—46.5

MURRAY TILLMAN, *Primary Examiner.*

WILLIAM H. SHORT, *Examiner.*